US012659989B2

(12) United States Patent
Tiirola et al.

(10) Patent No.: US 12,659,989 B2
(45) Date of Patent: Jun. 16, 2026

(54) SPECTRUM SHAPING FOR WIRELESS COMMUNICATIONS

(71) Applicant: Nokia Technologies Oy, Espoo (FI)

(72) Inventors: Esa Tiirola, Oulu (FI); Kari Pajukoski, Oulu (FI); Arto Lehti, Antony (FR); Ismael Peruga, Madrid (ES)

(73) Assignee: Nokia Technologies Oy, Espoo (FI)

( * ) Notice: Subject to any disclaimer, the term of this patent is extended or adjusted under 35 U.S.C. 154(b) by 491 days.

(21) Appl. No.: 18/252,636

(22) PCT Filed: Jan. 13, 2021

(86) PCT No.: PCT/EP2021/050511
§ 371 (c)(1),
(2) Date: May 11, 2023

(87) PCT Pub. No.: WO2022/152368
PCT Pub. Date: Jul. 21, 2022

(65) Prior Publication Data
US 2024/0015786 A1      Jan. 11, 2024

(51) Int. Cl.
*H04W 74/0808*      (2024.01)
*H04L 27/26*      (2006.01)

(52) U.S. Cl.
CPC ..... *H04W 74/0808* (2013.01); *H04L 27/2602* (2013.01)

(58) Field of Classification Search
CPC ........... H04W 74/0808; H04L 27/2602; H04L 27/2614; H04L 27/2636
USPC ........................................................ 370/329
See application file for complete search history.

(56) References Cited

U.S. PATENT DOCUMENTS

2009/0168730 A1 *   7/2009   Baum ................... H04L 5/0091
                                                              370/336
2021/0111938 A1 *   4/2021   Sahin ................. H04L 27/2626
2022/0271983 A1 *   8/2022   Ma ..................... H04L 27/2636

FOREIGN PATENT DOCUMENTS

EP            3496368 A1 *   6/2019   ............. H04L 27/20
WO     WO-2020155889 A1 *   8/2020   ........... H04L 5/0048

OTHER PUBLICATIONS

"On spectrum shaping for uplink Pi/2 BPSK with DFT-S-OFDM", 3GPP TSG-RAN WG1#89, R1-1709002, Agenda: 7.1.5, Nokia, May 15-19, 2017, 3 pages.

(Continued)

*Primary Examiner* — Kwang B Yao
*Assistant Examiner* — Syed M Bokhari
(74) *Attorney, Agent, or Firm* — Barta Jones, PLLC

(57)      ABSTRACT

According to an example aspect of the present invention, there is provided a method, comprising: determining to perform frequency domain spectral shaping with spectrum extension to prepare a wireless transmission comprising an inband and an excess band comprising a first excess band portion and a second excess band portion, determining an excess band size, performing remapping of frequency domain resource elements of the inband on the basis of the excess band size, to fill the first excess band portion, and adding, in accordance with the excess band size, a cyclic extension to the second excess band portion based on at least one frequency domain resource element in the inband after said remapping.

14 Claims, 6 Drawing Sheets

(56)                References Cited

OTHER PUBLICATIONS

"Further Link Results for p/2 BPSK DFT-S-OFDM Waveform with Spectrum Shaping and MMSE Receiver", 3GPP TSG RAN WG4 Meeting #85, R4-1714191, Agenda: 9.4.3.2, IITH, Nov. 27-Dec. 1, 2017, 4 pages.

"Performance evaluation for pi/2 BPSK with FDSS", 3GPP TSG RAN WG1 Meeting #88bis, R1-1705060, Agenda: 8.1.10, Huawei, Apr. 3-7, 2017, 8 pages.

"On the detection performance of pi/2-BPSK DFT-s-OFDM with transparent shaping", 3GPP TSG-RAN WG4 Meeting #84bis, R4-1710213, Agenda: 9.4.3.10, Huawei, Oct. 9-13, 2017, 4 pages.

"DFT-Spread OFDM with Pulse Shaping Filter in Frequency Domain in Evolved UTRA Uplink", 3GPP TSG RAN WG1 #42 on LTE, R1-050702, Agenda: 10.3, NTT DoCoMo, Aug. 29-Sep. 2, 2005, pp. 1-8.

"Understanding the 5G NR Physical Layer", Keysight, Retrieved on Apr. 25, 2023, Webpage available at : https://www.keysight.com/US/en/assets/9921-03326/training-materials/Understanding-the-5G-NR-Physical-Layer.pdf?&cc=IN&lc=eng.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.5.0, Sep. 2020, pp. 1-434.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.5.0, Sep. 2020, pp. 1-181.

International Search Report and Written Opinion received for corresponding Patent Cooperation Treaty Application No. PCT/EP2021/050511, dated Sep. 30, 2021, 12 pages.

"Frequency domain spectrum shaping for DFT-s-OFDM", 3GPP TSG RAN WG1 Meeting #88bis, R1-1705332, Agenda: 8.1.10, Samsung, Apr. 3-7, 2017, pp. 1-3.

Office action received for corresponding European Patent Application No. 21700427.4, dated Jun. 3, 2025, 7 pages.

* cited by examiner

600

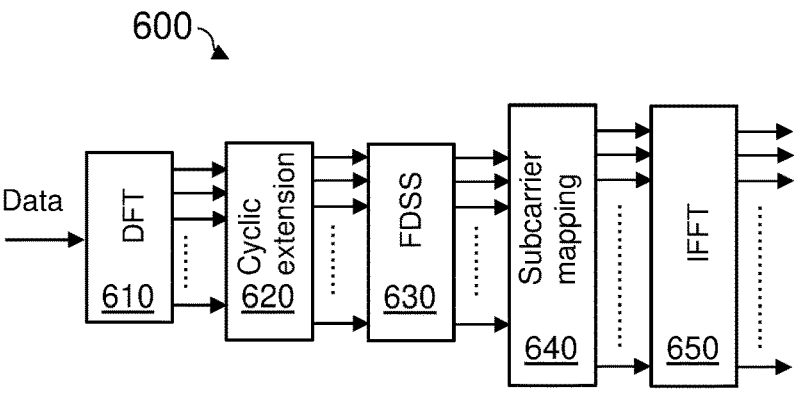

Fig. 6

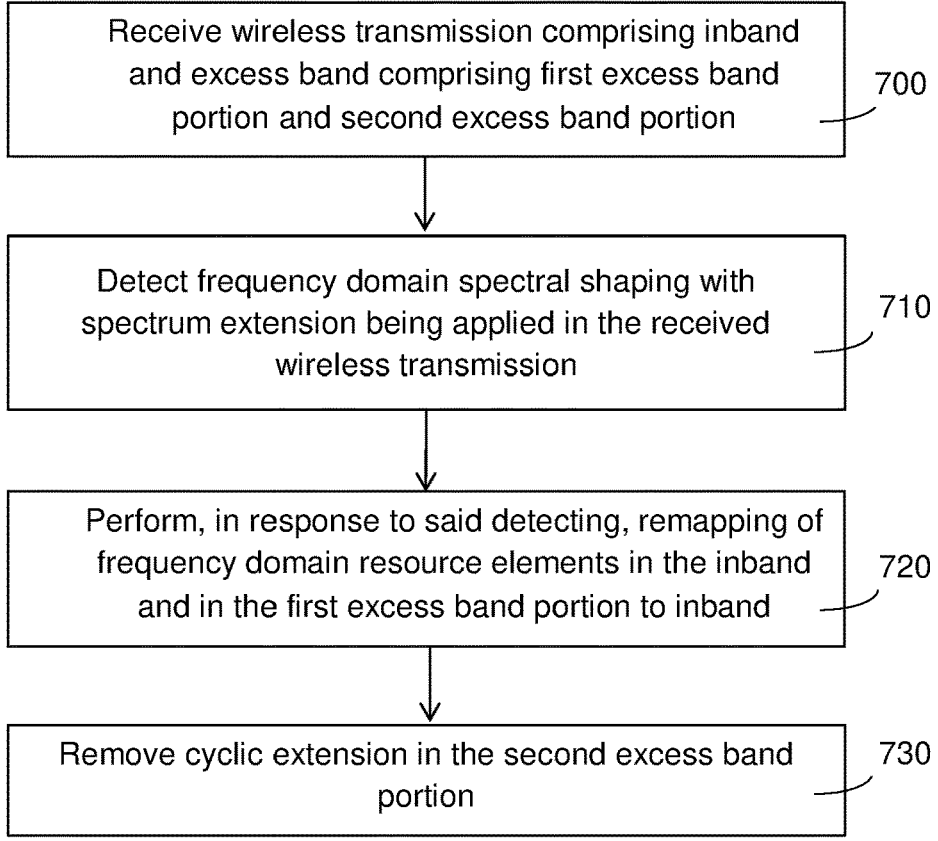

| Receive wireless transmission comprising inband and excess band comprising first excess band portion and second excess band portion | 700 |

| Detect frequency domain spectral shaping with spectrum extension being applied in the received wireless transmission | 710 |

| Perform, in response to said detecting, remapping of frequency domain resource elements in the inband and in the first excess band portion to inband | 720 |

| Remove cyclic extension in the second excess band portion | 730 |

Fig. 7

SPECTRUM SHAPING FOR WIRELESS COMMUNICATIONS

RELATED APPLICATION

This application was originally filed as PCT Application No. PCT/EP2021/050511, filed on Jan. 13, 2021, which is incorporated herein by reference in its entirety.

FIELD

Various example embodiments relate to spectrum shaping for wireless communications.

BACKGROUND

Orthogonal frequency division multiplexing (OFDM) is an example of a wireless technique enabling good spectral efficiency whilst providing resilience to selective fading, and it also enables multiple access capability to be implemented. Applications of new generation wireless systems pose increased performance requirements affecting waveform scheme to be utilized. Flexibility is one key requirement for a mobile communication system such as 5G. However, a challenge for many techniques is to achieve low peak-to-average power ratio (PAPR), enabling more power to be transmitted, increasing signal to noise ratio (SNR) at a receiver. This is particularly relevant for user devices transmitting in uplink direction.

Frequency domain spectrum shaping (FDSS) is one of techniques to achieve high spectral efficiency for high bandwidth applications. An FDSS function is applied to data converted into frequency domain. After applying the FDSS function, data is mapped to frequency domain resource elements and converted into time domain.

SUMMARY

Some aspects of the invention are defined by the features of the independent claims. Some specific embodiments are defined in the dependent claims.

According to a first aspect, there is provided a method for an apparatus, comprising: determining to perform frequency domain spectral shaping with spectrum extension to prepare a wireless transmission comprising an inband and an excess band comprising a first excess band portion and a second excess band portion, determining an excess band size, performing remapping of frequency domain resource elements of the inband on the basis of the excess band size, to fill the first excess band portion, and adding, in accordance with the excess band size, a cyclic extension to the second excess band portion based on at least one frequency domain resource element in the inband after said remapping.

According to a second aspect, there is provided an apparatus, comprising: means for determining to perform frequency domain spectral shaping with spectrum extension to prepare a wireless transmission comprising an inband and an excess band comprising a first excess band portion and a second excess band portion, means for determining an excess band size, means for performing remapping of frequency domain resource elements of the inband on the basis of the excess band size, to fill the first excess band portion, and means for adding, in accordance with the excess band size, a cyclic extension to the second excess band portion based on at least one frequency domain resource element in the inband after said remapping.

According to a third aspect, there is provided a method for an apparatus, comprising: receiving a wireless transmission comprising an inband and an excess band comprising a first excess band portion and a second excess band portion, detecting frequency domain spectral shaping with spectrum extension being applied in the received wireless transmission, performing, in response to said detecting, remapping of frequency domain resource elements in the inband and in the first excess band portion to inband, and removing a cyclic extension in the second excess band portion.

According to a fourth aspect, there is provided an apparatus, comprising: means for receiving a wireless transmission comprising an inband and an excess band comprising a first excess band portion and a second excess band portion, means for detecting frequency domain spectral shaping with spectrum extension being applied in the received wireless transmission, means for performing, in response to said detecting, remapping of frequency domain resource elements in the inband and in the first excess band portion to inband, and means for removing a cyclic extension in the second excess band portion.

The means may comprise at least one processor, and at least one memory including computer program code, the at least one memory and the computer program code being configured to, with the at least one processor, cause the performance of the apparatus.

There is also provided an apparatus comprising at least one processor, at least one memory including computer program code, the at least one memory and the computer program code being configured to, with the at least one processor, cause the apparatus at least to carry out the method (of the first or third aspect), or an embodiment thereof.

According to still further aspects, there is provided a computer program (product), a computer-readable medium, or a non-transitory computer-readable medium, comprising code for, when executed in a data processing apparatus, performing the method, or an embodiment thereof.

BRIEF DESCRIPTION OF THE DRAWINGS

FIG. 6 illustrates an example transmitter architecture;

FIG. 7 illustrates a method in accordance with at least some embodiments;

EMBODIMENTS

Figure 1:
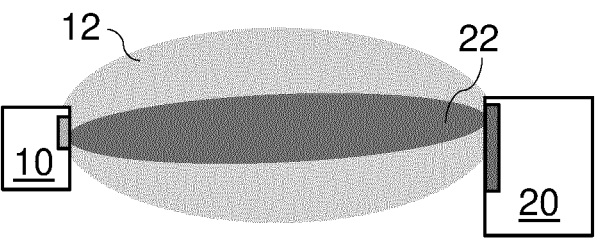
FIG. 1 illustrates wireless communication devices in accordance with at least some embodiments.

FIG. 1 illustrates a simplified example in accordance with at least some embodiments. A first communications device, in the present examples referred to as user equipment (UE), 10, communicates wirelessly with a second communication device, which may be a radio or access network node, hereafter referred to as AN, 20. The AN 20 may be a NodeB, an evolved NodeB (eNB), a Next Generation (NG) NodeB (gNB), a distributed unit of Integrated Access and Backhaul (IAB) node, a base station, an access point, or other suitable wireless/radio access network device or system. The term base station may refer to any one of NodeB, eNB, gNB, or other base station type. The AN 20 may provide communication coverage for a macro cell or a small cell, such as a pico cell or a femto cell, and/or other types of cell.

The UE 10 may be attached, connected or associated to a cell and/or network of the AN 20 for wireless communications. The air interface between UE and AN may be configured in accordance with a cellular or non-cellular RAT, which both the UE 10 and AN are configured to support. Examples of cellular RATs include Long Term Evolution, LTE, New Radio, NR, which is also known as fifth generation, 5G, and MulteFire.

The AN 20 may be connected, directly or via at least one intermediate node, with a core network (not shown), such as a Next Generation core network, Evolved Packet Core (EPC), or other network management element. The core network may comprise a set of network functions. A network function may refer to an operational and/or physical entity. The network function may be a specific network node or element, or a specific function or set of functions carried out by one or more entities, such as virtual network elements. For example, a Third Generation Partnership Project (3GPP) 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access. The AMF is in charge for managing handovers between gNBs.

The AN 20 may be connected with at least one other AN as well via an inter-base station interface, particularly for supporting mobility of the UE 10 or for backhaul connection, e.g. by 3GPP X2 or similar NG interface. A gNB may consist of a gNB-Control Unit (CU) and one or more gNB-Distributed Units (DUs), and the interface between gNB-CU and gNB-DU is called F1. One gNB-DU may support one or more cells.

The UE 10 may be referred to as a user device or wireless terminal in general. Hence, without limiting to 3GPP User Equipment, the term user equipment/UE is herein to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal. In some further example embodiments, the UE 10 may be a station of a wireless local area network or a mobile termination (MT) part of an IAB (relay) node.

The devices 10, 20 may be multi-antenna devices and comprise an antenna panel or array for beam-based transmission and reception. The devices may thus be configured to utilize their spatial degrees of freedom for beamforming their transmitted signals and/or placing nulls towards coexisting devices. In general, beamforming uses multiple antennas to control the direction of a wave-front by appropriately weighting the magnitude and phase of individual antenna signals in an array of multiple antennas. In beam-based communication, a directional signal may be transmitted in desired spatial direction by a beam. Beams may span over the entire cell coverage area and the UE 10 may be switched from one beam to another e.g. due to mobility of the UE (referred also to as beam level mobility). A beam and associated beamwidth may be selected or configured for transmission or reception by a transmitting/receiving device itself or by co-operation or control with another device (e.g. the gNB), depending on the system and/or use of the beam. For example, the UE 10 may communicate with the AN 20 using beam 12 and the AN 20 may communicate with the UE using beam 22.

In uplink direction from UE 10 to the AN 20, in addition to user data signals and control signals, reference signals, such as demodulation reference signals (DMRS) or sounding reference signals (SRS) are transmitted. In some embodiments, Zadoff-Chu (ZC) sequences are used in generation of reference signals in the UE 10, transmitted to the AN where the sequence is used to estimate the channel (for coherent demodulation), and estimate channel quality and other parameters. ZC sequences may be used also for conveying uplink control information via PUCCH (Physical Uplink Control Channel).

An applied transmission scheme should be such that PAPR of the transmitted signal can be minimized. A low PAPR modulation enables smaller allowed maximum power reduction (MPR) for the UE, facilitating improved uplink coverage.

Discrete Fourier Transform (DFT)-spread-OFDM (DFT-s-OFDM), also known as SC-FDMA, is a SC-like transmission scheme that can be combined with OFDM and provides further flexibility and particularly suitable for uplink transmissions from power-limited mobile devices, such as 5G NR UEs. We have detected that FDSS with spectral extension has considerable potential to improve uplink coverage for DFT-s-OFDM especially when using quadrature phase shift keying (QPSK) modulation.

Symmetric extension has been proposed for FDSS with spectral extension. Symmetric extension means that upper end of inband is copied to lower excess band, and vice versa i.e. lower end of inband is copied to upper excess band. However, we have found that symmetric extension may cause substantial PAPR issues for certain DMRS scenarios. A further problem with symmetric extension is that it is not directly applicable to 5G NR DMRS. There is a need to further develop FDSS techniques particularly to reduce PAPR.

There is now provided an improved FDSS scheme, in which cyclic spectral extension is applied.

Figure 2:
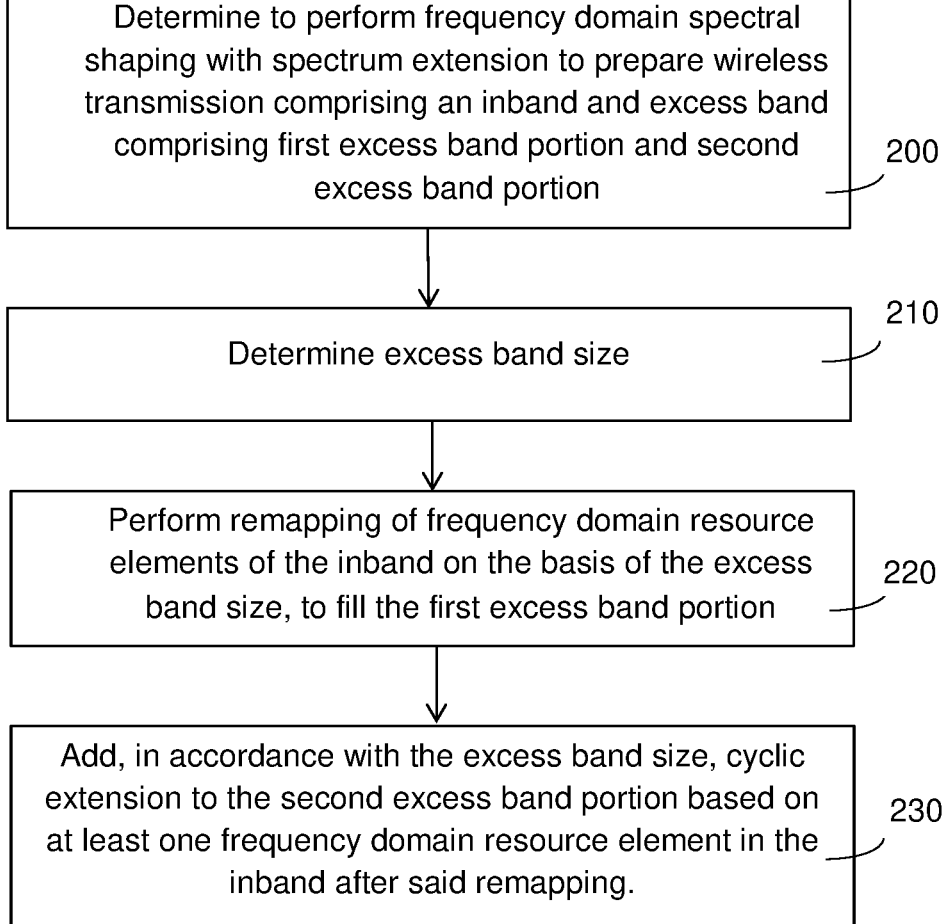
FIG. 2 illustrates a method in accordance with at least some embodiments.

FIG. 2 illustrates a method for FDSS. The method may be performed in or caused by a (transmitting first) wireless communications apparatus/device or a controller thereof, such as the UE 10, which may be communicating with a (receiving second) wireless communications device, such as the AN 20.

The method comprises determining 200 to perform frequency domain spectral shaping (FDSS) with spectrum extension to prepare a wireless transmission comprising an inband and an excess band comprising a first excess band portion and a second excess band portion. The excess band portions may be next to the inband, above and below the inband. Block 200 may be entered and/or performed on the basis of a (predefined) configuration, which may be based on a received control signal, in some embodiments based on a control message from the AN 20.

Block 210 comprises determining an excess band size.

Block 220 comprises performing remapping of frequency domain resource elements of the inband, to fill the first excess band portion on the basis of the excess band size.

Block 230 comprises adding, in accordance with the excess band size, a cyclic extension to the second excess band portion based on at least one frequency domain resource element in the inband after said remapping.

A cyclic spectral extension procedure may thus be performed. The cyclic extension procedure may comprise cyclically rearranging or repositioning resource elements (REs) initially allocated for the inband. This may comprise the remapping (or shifting) the REs towards the lower excess band or upper excess band, to occupy the respective excess band (with at least one RE), and then adding cyclic extensions to other excess band (such that consecutive order of the frequency domain REs remains). In the remapping, one or more REs at first end of inband (closer to the first excess band portion) may thus be shifted to the first excess band portion. After said adding of the cyclic extension, at least one RE of the second excess band portion differs from at least one RE of the first excess band portion.

The cyclically extended signal after block 230 may then be mapped to the frequency bins of inverse fast Fourier transform (IFFT), the frequency bins covering both the inband and the excess band.

The present features and the cyclic spectrum extension facilitate to improve PAPR as compared to symmetric extension. Further, only one copy operation is needed for excess band, which is advantageous for implementation.

Cyclic extension may generally refer to an extension added at least to an excess band on the basis of at least one RE (initially) in the inband, whereby the order of the RE is maintained. The first excess band portion may be an upper excess band above the inband and the second excess band portion may be a lower excess band portion below the inband. The remapping 220 may comprise shifting the frequency domain REs of the inband so that the upper excess band is filled. The lower excess band may generally refer to a frequency band covering lower frequencies than the inband, and the upper excess band may generally refer to a frequency band covering higher frequencies than the inband.

The inband portion may comprise original frequency domain REs. The excess band size may be determined 210 based on (an earlier defined/received higher layer) configuration and/or inband size. The excess band size may be preconfigured, and specific control signal may not be needed. The excess band size may be defined in (and determined based on) a control signal from the AN 20, such as an RRC message, which may also comprise information on inband size. In another example embodiment, the excess band size may be indicated via uplink grant message from the AN 20 to the UE 10.

In some embodiments, the first excess band portion and the second excess band portion are of the same size and located next to the inband. In some other embodiments, the first and second excess band portions are of different sizes. The method of FIG. 2 may be applied also in this case. In a still further embodiment, the excess band is located only at one side of the inband. The inband and the excess band thus form a contiguous set frequency domain REs. The excess band size may thus define a single size, applied for filling both the first excess band portion and the second excess band portion. The inband size and the excess band size may be defined in terms of frequency domain REs. The excess band size may be an even number of REs, shared evenly between the first excess and portion and the second excess band portion. Below some examples with references to physical resource blocks (PRB) are provided (instead of referring to frequency domain REs).

The cyclic extension may be added 230 (selectively) for data symbols, such as DFT-s-OFDM symbols for physical uplink shared channel (PUSCH) user data transmission and/or reference signal symbols, such as DFT-s-OFDM DMRS symbols. In an embodiment, the same cyclic extension is performed for both DMRS and data symbols. In another embodiment, cyclic extension is added differently for user data symbols and reference signal symbols, such as ZC based DMRS symbols. In a further example, DMRS is defined only for inband portion while DMRS for excess band is left for UE implementation.

The method may comprise (further) cyclic extension addition action, to add at least one RE in the inband, to fill or occupy "available resource" of the inband after the remapping 220. This may be a further step in addition to block 230, or as part of block 230 (whereby the cyclic extension addition of block 230 may comprise RE addition to both excess band portion and the inband). The method may comprise copying at least one frequency domain RE remapped to the first excess band portion to a (second) end of the inband next to the second excess band portion. Thus, after the remapping 230, such (further) cyclic extension in frequency domain is added to opposite end of inband REs (i.e. closer to the second excess band portion) based on leading or outermost of the shifted resource elements, to maintain the initial order between REs.

Figure 3A:
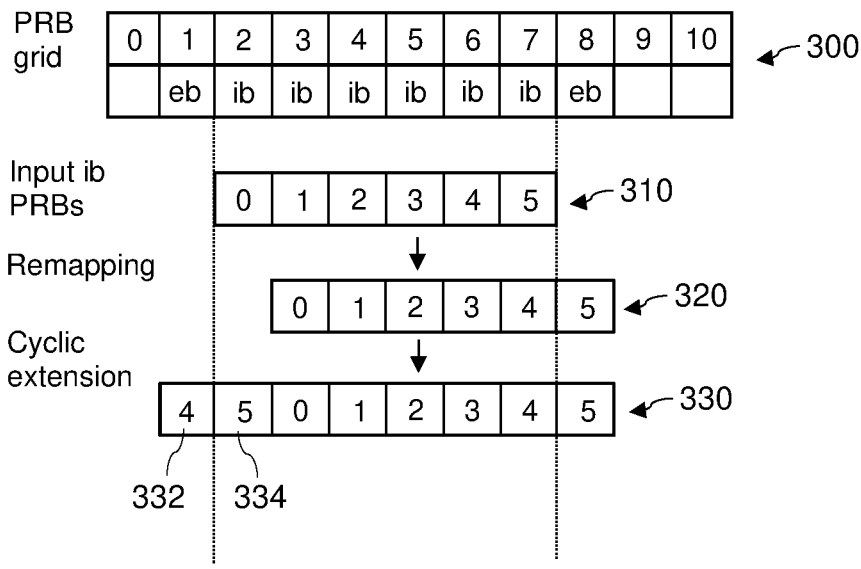
FIGS. 3a, 3b, 4, and 5 illustrate examples of frequency domain cyclic extension procedures.

FIG. 3a illustrates an example of performing FDSS with cyclic extension. Example PRB grid 0-10 300 comprises inband indicated by ib, with size of 6 PRBs (2-7), and excess band indicated by eb, having size of 2 PRBs, one portion (1 and 8) at both sides of the ib. Initial inband comprises a set of PRBs 0-5 310. Remapping (220) is performed, in the present example the set of PRBs is shifted to upper eb, resulting to set 320. In the cyclic extension addition operation (230), (shifted) eb PRB (5) is copied as PRB 334 to lower end of the inband and the ib PRB (4) closest to the upper eb is copied to lower eb 332. Thus, PRBs 332 and 334 represent the cyclic extensions of the output set 330 in this example.

The adding 230 of the cyclic extension may thus comprise copying, to the lower excess band, the PRB(s) in the inband which is/are next to the first excess band portion after the remapping 220. The upper excess band as after the remapping, may thus additionally be copied to a lower end of the inband.

Figure 3B:
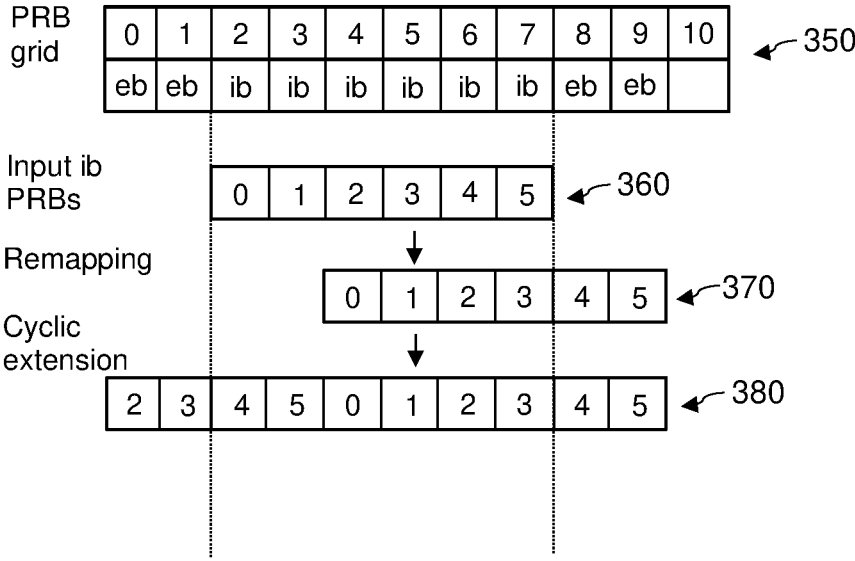

FIG. 3b illustrates another example in which in the example PRB grid 350 both the lower and the upper excess band has size of two PRBs. The initial input ib set of PRBs 360 is shifted to occupy both upper eb PRBs, resulting to set 370. PRB set 380 represents the final output after adding the cyclic extension.

In some embodiments, before adding 230 the cyclic extension, a circular shift is performed within the frequency domain REs (initially in the inband). The circular shift may also be referred to as cyclic shift and comprises cyclically repositioning the frequency domain REs. In one embodiment, the circular shift is performed before performing the remapping 220. In another embodiment, the circular shift is performed after the remapping 220.

Figure 4:
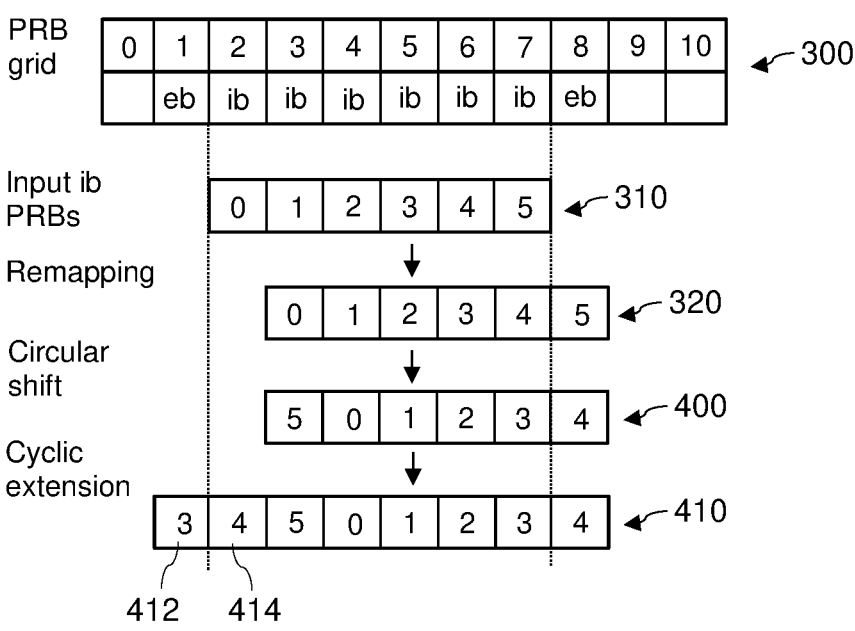

FIG. 4 illustrates an example in which a circular shift is performed after the remapping 320, in this example resulting in the sequence 400, in which one PRB (5) has been shifted to lower end of ib. Upon adding the cyclic extension after the circular shift, in the resulting PRB set 410 PRBs 412 and 414 are included, based on the uppermost ib PRB and eb PRB, respectively.

The circular shift may be performed for (user) data symbols, e.g. for PUSCH at 3GPP NR UE. The UE 10 may be configured to selectively perform the circular shift for different signals to be transmitted, such as differently for data signals than for reference signals. In an embodiment, the UE 10 performs circular shift for data symbols and not for reference signals (omits the circular shift for reference signals), such as ZC based DMRS symbols.

The circular shift may be dependent on applied modulation method. The circular shift may thus be modulation-wise circular shift. The effective circular or cyclic shift value for data symbols depends on applied modulation. For example, cyclic shift for QPSK is M/8 or nearest value that fits to the allocation, wherein M is DFT size. The latter can be defined based on floor or ceil operation. Cyclic shift for binary phase shift keying (BPSK) is M/4 or nearest value that fits to the allocation.

The modulation-wise circular shift is thus used to obtain phase-rotated symbols in time. The DFT property of circular shift in frequency domain corresponds to a phase shift in time-domain. The DFT is periodic in M, leaving $$X((k-m) \bmod M) = x(n)e^{-\left(\frac{j2\pi nm}{M}\right)}$$

It can be seen that if m=M/8, the exponential term in this equation corresponds to $$e^{-\left(\frac{j2\pi n}{8}\right)},$$

meaning that effectively in time, every other sample (n) would be shifted π/4 rad. By using different cyclic shift for different modulations (e.g. M/8 for QPSK and M/4 for BPSK), the PAPR/CM can be reduced. The final cyclic shift has to be measured with respect to the size of the inband (M). Effective cyclic shift may refer on the generated shift of the original RB after the cyclic extension processing is done (i.e. after block 230). For that reason, if the modulation-wise circular shift is performed, the side of the extended band needs to be taken into account. For example, if the desired effective cyclic shift at the end of the cyclic extension processing is M/8 and inband PRBs are remapped to first excess band portion eb_1 having size of one PRB, circular shift would be M/8−eb_1. Since M=8 and eb_1=1, no circular shift would be performed (since shift by one PRB is already performed by the remapping).

Instead of shifting one or more entire REs, the circular shift may comprise partial circular shifting (within the shifted REs or REs of inband before the remapping). This circular shift may thus be such that only a portion of a (leading) RE is shifted (to other end of the REs).

Figure 5:
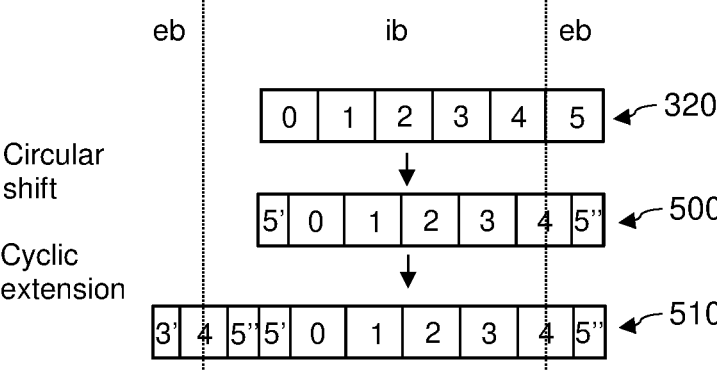

FIG. 5 illustrates an example of such circular shift with partial PRB shift. The remapped PRB set 320 is partially circularly shifted, with partial PRBs indicated by 5' (first portion of PRB 5) and 5" (second portion of PRB 5), so that the shift is 0.5 PRB. First portion of PRB 3, 3', is also included in the lower eb by the cyclic extension. Thus, in total the PRB shift is 1.5 PRB. For example, it may be assumed that the UE 10 has performed DFT spreading according to 12* number of inband PRBs, i.e. 12*6=72 in this example. The total shift due to remapping and the particle PRB circular shift is thus 18 subcarriers. Set 510 illustrates the output after the addition of cyclic extension (in the present example based on the highest frequencies of set 500).

It is to be noted that the FIGS. 3*a*, 3*b*, 4, and 5 illustrate only some simple examples, and various other embodiments are available. For example, remapping and/or circular shift may be performed in another direction, and the cyclic extension may be copied from lowest frequencies to highest frequencies. In another example, the circular shift is performed before the remapping. Furthermore, although reference is made above to PUSCH transmission as an example, at least some of the presently disclosed features may be applied for other channels, signals or scenarios. For example, presently disclosed features may be applied for uplink control information transmission, such as PUCCH transmission.

Reference is made to the transmitter example 600 of FIG. 6, which may illustrate blocks for DFT-s-OFDM transmitter according to some embodiments. DFT block 610 is used to convert a block of input data samples into frequency domain, for FDSS with spectral extension processing. The remapping may be performed 220 and the cyclic extension may be added 230, as illustrated by cyclic extension block 620, after the DFT block 610 for symbols to be transmitted. Further frequency domain processing/shaping may be performed, as also illustrated by block 630, for output of the block 620, e.g. PRB set 330, 410, 510. The cyclically extended (and shifted) signal may be weighted according to applied shaping filter. Already known frequency domain shaping techniques may be applied by block 630.

Resulting frequency bins are mapped or allocated to selected subcarriers (SC) by block 640. IFFT operation is performed by block 650 to convert output of the cyclic extension FDSS procedure mapped to subcarriers to time-domain. After IFFT, cyclic prefix (CP) may be inserted to combat multipath and to ease the receiver equalization, and time windowing performed to transmit the signal. It is to be noted that, depending on applied implementation, order of some of the blocks in FIG. 6 may be different. For example, block 630 may be after block 640. Furthermore, in some embodiments, certain blocks are not needed. For example, DMRS processing does not use DFT 610.

FIG. 7 illustrates a method for receiving a frequency domain spectral shaped transmission. The method may be performed in or caused by a (receiving) wireless communications apparatus/device or a controller thereof, such as the AN 20, which may be communicating with a (transmitting) wireless communications device which may perform the method of FIG. 2, such as the UE 10.

Block 700 comprises receiving a wireless transmission comprising an inband and an excess band comprising a first excess band portion and a second excess band portion. Block 710 comprises detecting FDSS with spectrum extension being applied in the received wireless transmission. Block 720 comprises performing, in response to said detecting, remapping of frequency domain resource elements in the inband and (at least) in the first excess band portion to inband. Block 730 comprises removing a cyclic extension (at least) in the second excess band portion.

Thus, the receiving device, the AN 20 in the below example embodiments, may perform a cyclic extension reversion procedure for the wireless transmission. The cyclic extension reversion procedure may comprise removing cyclic extension applied for the wireless transmission (by the cyclic extension procedure in the transmitting device).

In addition to operations of FIG. 7, the AN 20 may be configured to perform further operations, dependent on the applied embodiments and chosen implementation. These include counter-operations to some or all frequency domain spectral shaping embodiments illustrated for the transmitting device above. For example, if circular shift is applied in the wireless transmission, the AN 20 will remove or cancel it and reinstate the original order.

The AN 20 may combine associated samples in the inband and the first excess band portion and/or associated samples in the inband and the second excess band portion. These samples are combined or obtained for such further processing before removing 730 the cyclic extension.

Figure 8A:
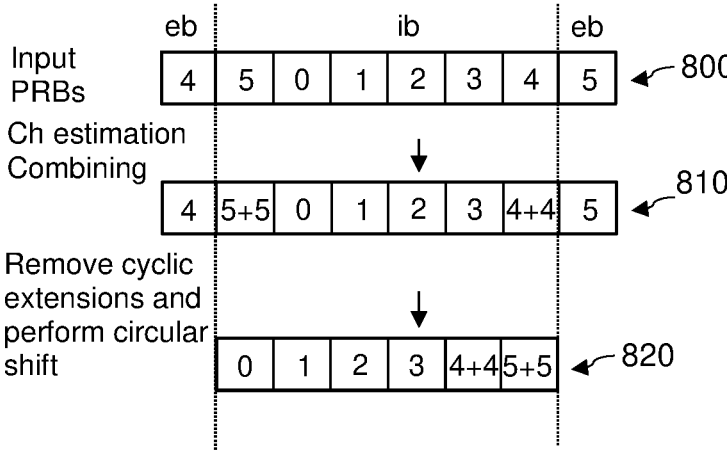
FIGS. 8a and 8b illustrate receiver frequency domain operations for processing comprising a cyclic extension.

With reference to example of FIG. 8*a*, after FFT, the AN 20 may perform channel estimation and correction for the wireless transmission using the entire input PRB set 800, based on the inband and the excess band. Channel corrected excess band subcarriers may be summed to associated inband subcarriers, and sum signal may be equalized based on the summing. Set 810 illustrates the result after the summing (4+4 and 5+5). In this example the remapping 720 is performed by the summing of the respective PRBs in the excess band portion and the inband (and the whole set of PRBs does not need to be shifted off the upper/lower excess band portion). The cyclic extensions may then be removed (both upper and lower excess band). In the example of FIG. 8*a*, circular shift by 1 PRB is applied (to obtain the initial order of PRBs as before block 220 in the transmitter), and an output set 820 of the cyclic extension reversion procedure is resulted.

Figure 8B:
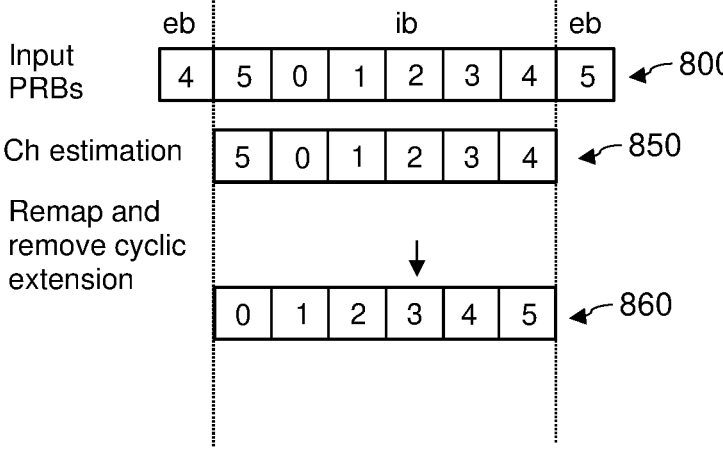

However, in case of a simple or baseline receiver, the receiver may just discard the energy in the excess band portions. With reference to example of FIG. 8*b*, the receiver may perform channel estimation based on the inband PRBs 850 only. For the input set 800, the receiver performs remapping and removes the cyclic extension(s), resulting in an output set 860 of the cyclic extension reversion procedure. In an embodiment, the remapping comprises shifting the set of PRBs from the first (e.g. upper) excess band to the inband, in which case only the cyclic extension in the second (lower) excess band is removed. The procedure may additionally or alternatively further comprise removing the circular shift, if applied.

The apparatus or the UE configured to perform the method of FIG. 2 may be controlled to perform the FDSS with spectrum extension (and particularly cyclic extension) based on at least one of a radio resource control (RRC) configuration and/or a downlink control information (DCI) message received from an AN, such as gNB. There may be further block(s) in the method of FIG. 7 before block 700, of determining or scheduling resource allocation, and appropriate RRC configuration and/or DCI message, for the FDSS with spectrum (and cyclic) extension, and (causing) transmitting a control signal comprising the RRC configuration and/or the DCI information to the UE 10. A scheduling entity of the AN such as a gNB scheduling entity may be configured to perform such further block(s). Block 710 may also be performed based on or controlled by such scheduling entity.

In an example embodiment, the AN 20 controls the FDSS (with cyclic extension) feature on and off by RRC control. In an example embodiment, a new information element is included for this purpose in a suitable PUSCH or UL bandwidth part related configuration message. The new configuration may comprise parameters needed to switch the FDSS on.

The AN 20 may trigger the FDSS (with cyclic extension) for the wireless transmission by a DCI message. The DCI message may comprise an information element indicative of controlling (parameters of) the FDSS with cyclic extension, in response to which block 200 is entered. The configuration may relate to certain DCI format (e.g. DCI format 1_1) or DCI formats. Depending on the implementation, the FDSS may be triggered by receiving the related DCI format, or by reading a specific information element of the DCI format. The AN 20 may be configured to detect 700 the spectral shaping based on the higher layer configuration and/or dynamic scheduling.

Figure 9:
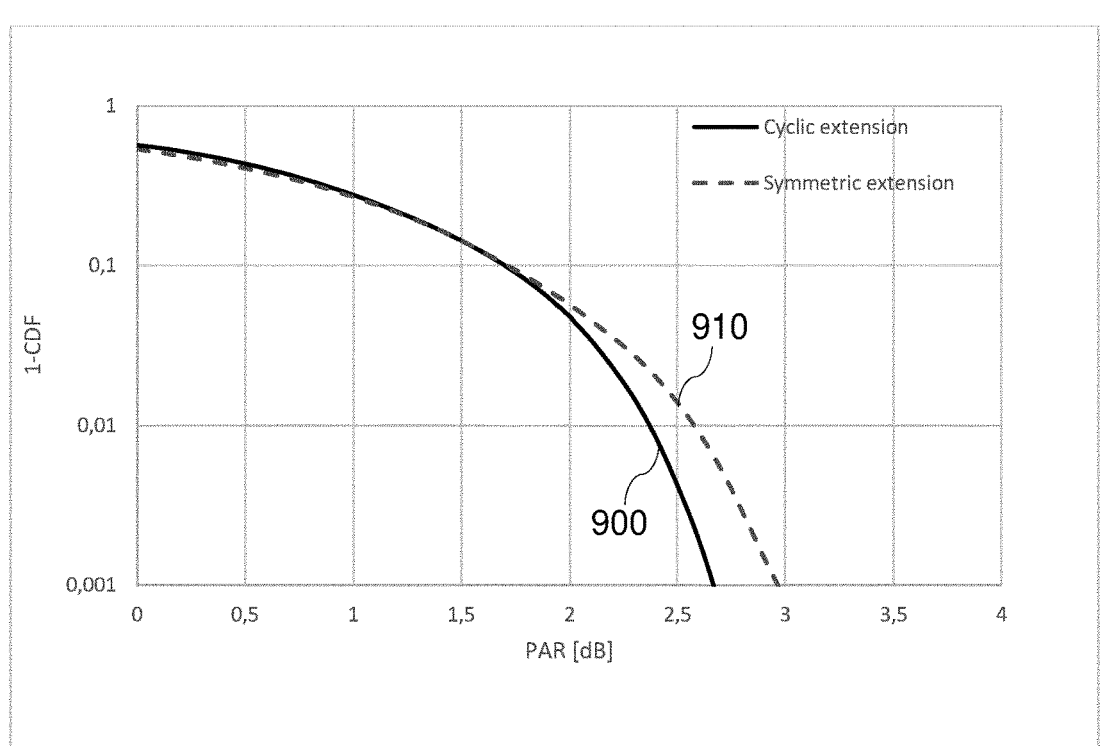
FIG. 9 illustrates PAPR performance comparison.

FIG. 9 illustrates comparison of PAPR performance, and shows that the presently disclosed FDSS scheme with cyclic extension 900 provides PAPR gain compared to reference FDSS scheme with symmetric extension 910.

While some example embodiments have been described in the context of 5G NR based systems, it should be appreciated that these or other embodiments of the invention may be applicable in connection with other wireless technologies configured to operate on licensed or non-licensed band, such as 6G cellular systems or other existing or future technologies.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a base station, an access point or node device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

The apparatus may comprise a communication circuitry providing the apparatus with capability of communicating in at least one wireless network. The communication circuitry may employ a radio interface providing the apparatus with radio communication capability. The radio interface may comprise a radio modem RF circuitries providing at least a part of the physical layer(s) of the wireless device. The radio interface may be comprised in the apparatus in the embodiments where the apparatus is the wireless device. In other embodiments where the apparatus is a chipset for the wireless device, the radio interface may be external to the apparatus.

The radio interface may support transmission and reception according to the principles described above. The RF circuitries may comprise radio frequency converters and components such as an amplifier, filter, and one or more antennas. The radio modem may comprise baseband signal processing circuitries, such as (de)modulator and encoder/decoder circuitries. The communication circuitry may comprise one or more controllers configured to carry out at least some of the features described above. In embodiments where the apparatus employs multiple physical layer entities, the radio modem and the RF circuitries may employ a separate transmitter and receiver branch for each of the multiple links supported by the apparatus. The radio modem and the RF circuitries may include a dedicated circuitry for the physical layer and another dedicated circuitry for the physical layer, although the dedicated circuitries may employ partially the same physical components in the transmission and/or reception.

As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile user device, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 10:
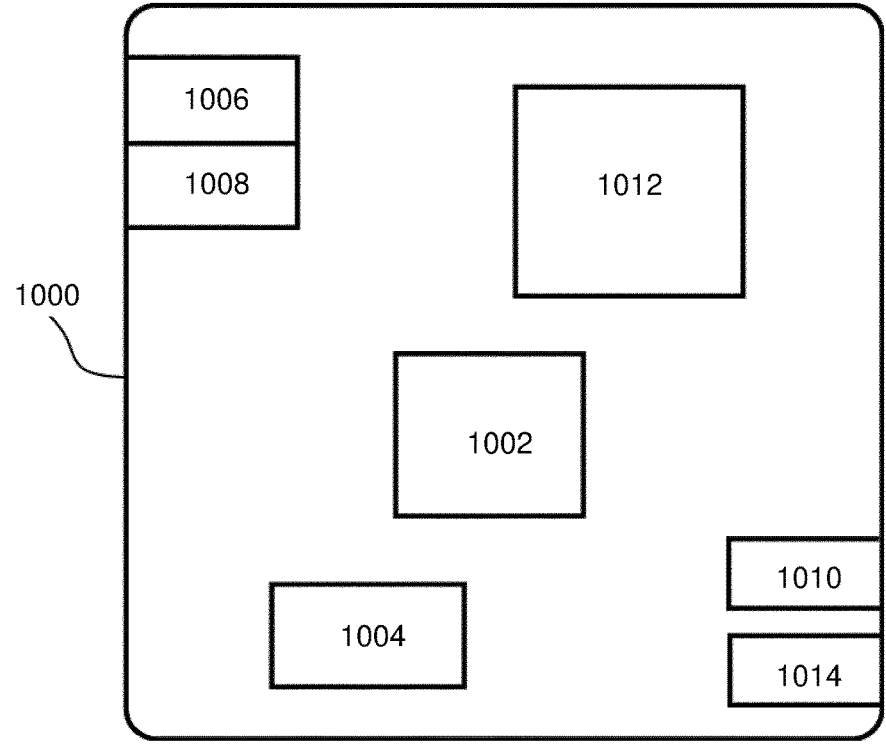
FIG. 10 illustrates an example apparatus capable of supporting at least some embodiments.

FIG. 10 illustrates an example apparatus capable of supporting at least some embodiments of the present invention. Illustrated is a device 1000, which may comprise a wireless communications device, which may be configured to operate as the AN 20 or the UE 10, for example. The device may include one or more controllers configured to carry out operations in accordance with at least some of the embodiments illustrated above, such as some or more of the features illustrated above in connection with FIG. 2 to 6 or 7 to 8b. The device may be configured to operate as the apparatus configured to carry out the method of FIG. 2 or 7, for example.

Comprised in the device 1000 is a processor 1002, which may comprise, for example, a single- or multi-core processor wherein a single-core processor comprises one processing core and a multi-core processor comprises more than one processing core. The processor 1002 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 1000 may comprise memory 1004. The memory may comprise random-access memory and/or permanent memory. The memory may comprise at least one RAM chip. The memory may comprise solid-state, magnetic, optical and/or holographic memory, for example. The memory may be at least in part accessible to the processor 1002. The memory may be at least in part comprised in the processor 1002. The memory 1004 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 1000 but accessible to the device. For example, control parameters affecting operations related to the FDSS cyclic spectrum extension may be stored in one or more portions of the memory and used to control operation of the apparatus. Further, the memory may comprise device-specific cryptographic information, such as secret and public key of the device 1000.

The device 1000 may comprise a transmitter 1006 and a receiver 1008. The transmitter 1006 and the receiver 1008 may be configured to operate in accordance with a wireless, cellular or non-cellular standard, such as wideband code division multiple access, WCDMA, long term evolution, LTE, 5G, 6G, or other cellular communications systems, and/or a WLAN standard, for example. The device 1000 may comprise a near-field communication, NFC, transceiver 1010. The NFC transceiver may support at least one NFC technology, such as NFC, Bluetooth, Wibree or similar technologies.

The device 1000 may comprise user interface, UI, 1012. The UI may comprise at least one of a display, a keyboard, a touchscreen, a speaker and a microphone. A user may be able to operate the device via the UI, for example to configure or control the device.

The device 1000 may comprise or be arranged to accept a user identity module or other type of memory module 1014. The user identity module may comprise, for example, a subscriber identity module, SIM, and/or a personal identification IC card installable in the device 1000. The user identity module may comprise information identifying a subscription of a user of device 1000. The user identity module 1014 may comprise cryptographic information usable to verify the identity of a user of device 1000 and/or to facilitate encryption and decryption of communication effected via the device 1000.

The processor 1002 may be furnished with a transmitter arranged to output information from the processor, via electrical leads internal to the device 1000, to other devices comprised in the device. Such a transmitter may comprise a serial bus transmitter arranged to, for example, output information via at least one electrical lead to memory 1004 for storage therein. Alternatively to a serial bus, the transmitter may comprise a parallel bus transmitter. Likewise the processor may comprise a receiver arranged to receive information in the processor, via electrical leads internal to the device 1000, from other devices comprised in the device 1000. Such a receiver may comprise a serial bus receiver arranged to, for example, receive information via at least one electrical lead from the receiver 1008 for processing in the processor. Alternatively to a serial bus, the receiver may comprise a parallel bus receiver.

The device 1000 may comprise further devices not illustrated in FIG. 10. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 1010 and/or the user identity module 1014.

The processor 1002, the memory 1004, the transmitter 1006, the receiver 1008, the NFC transceiver 1010, the UI 1012 and/or the user identity module 1014 may be interconnected by electrical leads internal to the device 1000 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

What is claimed is:

1. An apparatus comprising:
at least one processor; and
at least one memory storing instructions that, when executed by the at least one processor, cause the apparatus at least to:
determine to perform, based on at least one of a radio resource control configuration and a downlink control information message received from an access network node, frequency domain spectral shaping with spectrum extension to prepare a wireless transmission comprising an inband and an excess band, the excess band comprising a first excess band portion and a second excess band portion;
determine an excess band size;
perform remapping of frequency domain resource elements of the inband based on the excess band size to fill the first excess band portion; and
add, in accordance with the excess band size, a cyclic extension to the second excess band portion based on at least one frequency domain resource element in the inband after the remapping; and
generate and transmit, based on the frequency domain spectral shaping with the spectrum extension, the wireless transmission as an uplink transmission from the apparatus to the access network node.

2. The apparatus of claim 1, wherein the instructions, when executed by the at least one processor, further cause the apparatus to: copy at least one frequency domain resource element remapped to the first excess band portion to an end of the inband next to the second excess band portion.

3. The apparatus of claim 2, wherein the first excess band portion is an upper excess band above the inband and the second excess band portion is a lower excess band portion below the inband,
the remapping comprises shifting the frequency domain resource elements of the inband to fill the upper excess band,
the adding of the cyclic extension comprises copying, to the lower excess band, at least one frequency domain resource element in the inband which is next to the upper excess band portion after the shifting.

4. The apparatus of claim 1, wherein the first excess band portion and the second excess band portion are of same size and located next to the inband.

5. The apparatus of claim 1, wherein the instructions, when executed by the at least one processor, further cause the apparatus to add the cyclic extension for at least one of data symbols and demodulation reference signal symbols.

6. The apparatus of claim 1, wherein the instructions, when executed by the at least one processor, further cause the apparatus to: perform, before adding the cyclic extension, a circular shift within the frequency domain resource elements.

7. The apparatus of claim 6, wherein the circular shift is dependent on an applied modulation method.

8. The apparatus of claim 6, wherein the instructions, when executed by the at least one processor, further cause the apparatus to: perform the circular shift for data symbols and omit the circular shift for demodulation reference signal symbols.

9. The apparatus of claim 1, wherein the instructions, when executed by the at least one processor, further cause the apparatus to: perform the remapping and add the cyclic extension after a discrete Fourier transform operation for symbols for transmission and before an inverse fast Fourier transform operation to convert an output of adding the cyclic extension mapped to subcarriers to a time-domain signal.

10. The apparatus of claim 1, wherein the apparatus is a user equipment, or is included in the user equipment, the user equipment comprising a New Radio transmitter.

11. An apparatus comprising:
at least one processor; and
at least one memory storing instructions that, when executed by the at least one processor, cause the apparatus at least to:
receive a wireless transmission comprising an inband and an excess band, the excess band comprising a first excess band portion and a second excess band portion;

detect frequency domain spectral shaping with spectrum extension being applied in the wireless transmission;

in response to detecting the frequency domain spectral shaping, perform channel estimation and correction for the wireless transmission based on the inband and the excess band to generate channel corrected subcarriers;

perform, before removing a cyclic extension, a remapping of frequency domain resource elements from the excess band to the inband by generating a sum signal by summing at least one of:

the channel corrected subcarriers from the first excess band portion with associated channel corrected subcarriers in the inband, and the channel corrected subcarriers from the second excess band portion with associated channel corrected subcarriers in the inband;

remove the cyclic extension in the second excess band portion from the sum signal; and equalize the sum signal after the removal of the cyclic extension.

12. The apparatus of claim 11, wherein the apparatus is an access network node, or the apparatus is included in the access network node, the wireless transmission is an uplink transmission from a user equipment, and the instructions, when executed by the at least one processor, further cause the apparatus to trigger the uplink transmission by a downlink control information message.

13. A method for an apparatus, comprising:

determining to perform frequency domain spectral shaping with spectrum extension to prepare a wireless transmission comprising an inband and an excess band comprising a first excess band portion and a second excess band portion, wherein the first excess band portion is an upper excess band above the inband and the second excess band portion is a lower excess band portion below the inband;

performing the frequency domain spectral shaping by:

determining an excess band size;

shifting frequency domain resource elements of the inband based on the excess band size, to fill the upper excess band; and adding a cyclic extension to the lower excess band portion by copying, to the lower excess band portion, a first at least one frequency domain resource element in the inband that is next to the upper excess band after the shifting; and copying a second at least one frequency domain resource element remapped to the upper excess band to an end of the inband next to the lower excess band portion.

14. The method of claim 13, wherein the first excess band portion and the second excess band portion are of same size and located next to the inband.

* * * * *